United States Patent Office 2,873,135
Patented Feb. 10, 1959

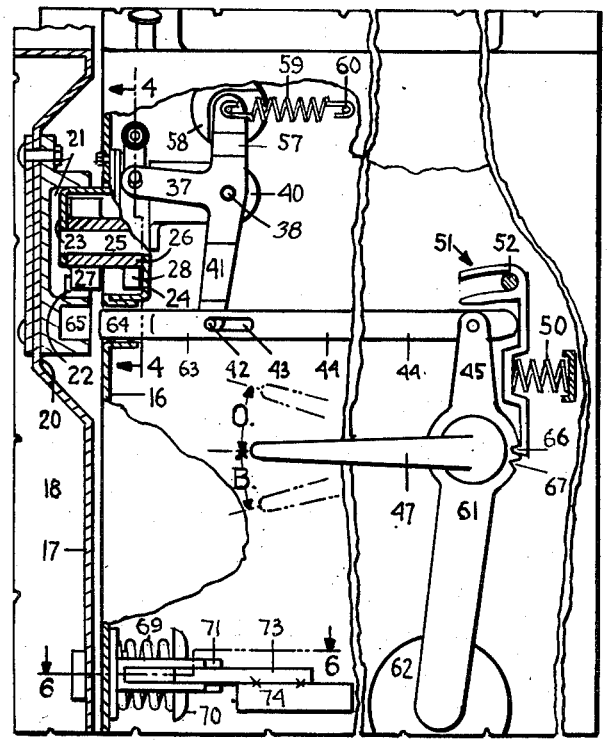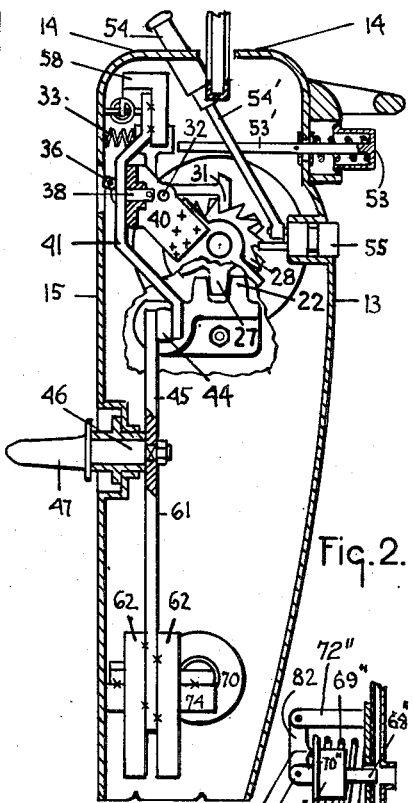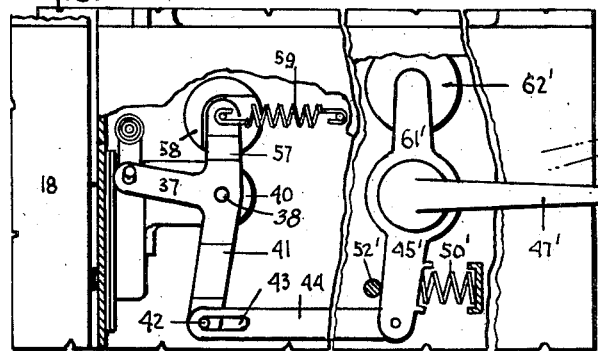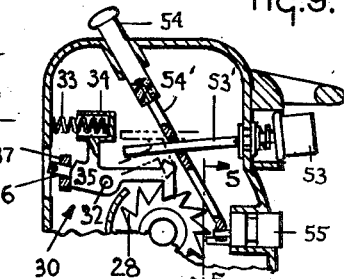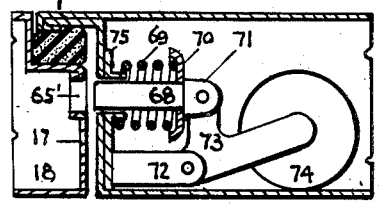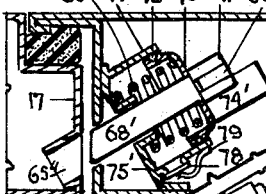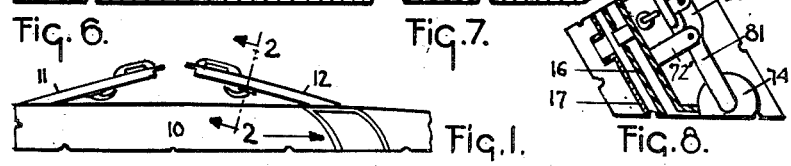

2,873,135

AUTOMOBILE DOOR LOCK CONTROL

Jules Haltenberger, Rancho Santa Fe, Calif.

Application August 9, 1955, Serial No. 527,213

1 Claim. (Cl. 292—280)

The present invention relates to means, for preventing automobile doors from coming ajar, when in a collision.

It is known, that closed, or assumed locked doors of an automobile, after a collision, are found ajar, or completely open, the driver or passengers are found outside of the vehicle, usually wounded, or even run over by a following automobile.

The aeroplane type of safety belt—if applied—prevents the falling out of the automobile, beyond that, they are harmful.

All the presently used automobile door locks, that applicant is aware of, include a rotatable ratchet, held in door locking position, by a spring loaded nose engaging pawl. A door release mechanism is associated with the pawl, arranged to be operated by a door release handle, positioned on the inner side of the door. In a generally forwardly collision, the mass inertia of the pawl releasing mechanism overcomes the pressure of the spring that holds the pawl in door locking position, the lock released, the door can become ajar.

It was proposed, to lock an automobile door, at above a predetermined vehicle speed, by a speedometer cable operated governor. It was also proposed, to provide on an emergency door, like on buses (usual passenger automobiles are without emergency doors), a safety lock release, operated by a constantly depending pendulum.

To prevent a door lock release in a collision, it is here proposed, and is the object of my invention, to provide a usual automobile door lock release mechanism, with an inertia weight, in counter-acting association on the lock release mechanism.

A further object is, to provide on an automobile door having a manually releasable lock, door bolting means, operated automatically by an inertia weight, and to make it releasable manually or automatically.

Further objects will appear as the description proceeds.

Referring to the drawings: Fig. 1 is a plan elevation of the left side of an automobile, indicating a rear hinged rear door and a front hinged front door; Fig. 2 is a section taken substantially on line 2—2 of Fig. 1, shown in a larger scale; Fig. 3 is a fragmental side elevation of Fig. 2, with most of the door inner panel omitted; Fig. 4 is a section taken substantially on line 4—4 of Fig. 3; Fig. 5 is a section taken substantially on line 5—5 of Fig. 4, here shown in a larger scale; Fig. 6 is a section taken substantially on line 6—6 of Fig. 3; Fig. 7 is a modification of the invention in regard to its position in the automobile door and dash pot jacketing for slowed down return; Fig. 8 is a side elevation of Fig. 7, shown in a smaller scale; Fig. 9 is a further modification of the invention; Fig. 10 is a regrouping of a part of Fig. 3.

Referring to Figs. 1 to 6 inclusive, it will be seen that an automobile 10 is provided with a rear-hinged rear door 11 and a front-hinged door 12. This front-hinged door is formed of an outside wall 13, top wall 14, inside wall 15 and rear-end wall 16, with this door in closed position, the rear wall 16 is disposed adjacent to the body door ledge front wall 17, of the automobile body 18.

A portion of wall 17 is set rearwardly, to form a reinforced seat for a body bracket having a forwardly extending U slot 21, with door lock pinion engaging rack teeth 22 on the bottom part thereof.

The door rear wall 16, supports a therethrough protruding rearwardly extending housing, having a rear wall 23 (bottom part thereof cut away), and a forwardly extending substantially duplicate housing having a front wall 24 (top outward part thereof cut away). Walls 23 and 24 support a spindle 25, on which a hub 26 has a body rack engaging door lock, pinion, having teeth 27, and ratchet teeth 28, the hub is rotatable on the spindle.

When the door is being closed, one of the teeth 27 engages the outer tooth 22, rotating the teeth provided hub counter-clockwise (as viewed in Figures 2 and 4), the spring loaded pawl generally at 30, having a ratchet engaging nose generally at 31, and operating on a stationary fulcrum 32, permits such rotation, until the door is completely closed.

The nose of pawl is urged into a door locking space in between two adjacent ratchet teeth as by spring 33 in housing 34. By the action of the spring, and one way ratcheting, the pawl, in effect, is a self-engaging locking device. The pawl also includes a hub portion (Fig. 4) 35, having a protruding pin 36, arranged to be operatively engaged by the end of a substantially horizontal lever 37 operating on fulcrum 38 (in stationary bracket 40) and it is provided with a depending ratchet release lever 41. Lever 41 forms a door release mechanism.

The bottom of lever 41, as by pin 42, in slot 43, in reach rod 44, is unidirectionally connected to lever 45, operating on shaft 46, that is integral with door handle 47.

When the door handle is lifted to the distance O, lever units 37 and 41 turn counter-clockwise (as viewed in Fig. 3), this unit moves the pawl also counter-clockwise (as viewed in Figs. 2 and 4), lifting the ratchet engaging nose, thereby, permitting the opening of the door. When the door handle is released, the pressure of mild compression spring 50, and the action of spring gate generally at 51 and limited in its motion by stationary pin 52, returns the handle to the position indicated in Figs. 2 and 3.

Hereinabove, applicant described the elements, or substitutes thereof, available in all new automobiles that applicant is aware of. The drawings also indicate well-known elements in a schematical way. As shown in Fig. 2, the door can be opened by a spring loaded push button, as by rod 53', pressing on housing 34. By depressing safety plunger 54, by the movement of rod 54', as shown in Fig. 4, the button door opening is suspended, and the key lock 55 somewhat rotated, places lock pin 56 under a ratchet tooth 28. By pulling up on the plunger, or by lifting the interior door handle, the elements are returned to the positions shown in Figs. 2 and 3. The action of these elements corresponds to the ones now on all new automobiles applicant is aware of, and are only indicated to show that they do not interfere with the invention described hereinbelow:

In case of a direct or generally forwardly collision, pawl 30 being disposed transverse to the automobile, will not be directly affected. However, the associated depending lever 41 by its very weight and inertia, will release the pawl, and cause the opening of the door. To overcome this serious defect, above the fulcrum of lever 41, applicant provides in counter-acting association, an upstanding arm 57 having an inertia weight 58, secured thereto as by welding. It is calculated to provide a greater directional mass energy in generally forward collision, than the mass energy of lever 41 and associated parts, to assure the pawl holding the ratchet from turning. After the vehicle stops, directional mass energies are canceled, and the door is normally openable. To avoid the reliance on a single coil spring to hold the pawl in place, an additional mild spring 59 is provided, when so desired, it is anchored on a stationary pin 60.

At sudden collision stopping of the automobile, the reach rod 44 and lever 45 continuing their forward motion, overcoming the resisting effect of mild spring 50, will operate levers 41, 37 and pawl 30 and release the door lock. To overcome this serious defect, applicant provides a depending lever 61 having an inertia mass 62, thereby changing the reach rod and upstanding lever inertia from a door opening, to a door closed position holding effect.

For certain automobiles, the adoption of the use of inertia masses 58 and 62 (and spring 56 when so desired) in design or in form of replacement parts, would assure a desired margin of safety. (These main elements are shown in Fig. 10, and are to be described).

When an additional safety factor is desired to prevent the door openings at substantially head-on collision, is also illustrated in Figs. 2 and 3. As shown, the reach rod 44 is provided with an extension 63, that terminates in a door locking bolt portion 64, arranged to enter into a door opening prevention pocket opening 65, when the door handle is depressed by the driver (or passengers) to B. In such event, the spring gate nose 66 engages notch 67, to urge the door handle and associated parts to remain in this door bolted position. The door remains bolted until manually released.

It is important to note that availability of a safety device induces the operator's subconscious to neglect the use of same. In this proposal, in case of a near or head-on collision, the inertia mass 62 will automatically bolt the door, and hold it bolted until manually released.

For certain application, applicant provides means to bolt the door at collision and thereafter release it automatically. A broadside application thereof is shown in the lower parts of Figs. 2, 3 and Fig. 6. As illustrated, a longitudinally slidable bolt 68 aligned with opening 65' in body wall 17 is held out of action by spring 69, seated on spring retainer disc 70. The bolt head 71 is operatively connected to stationary bracket 72 by an arcuately movable bell crank 73 having an inertia weight 74. Applicant prefers to mount these parts on a plate 75, to form an accessory for an automobile now in use or contemplated.

Should this automobile be hit on its left side, inertia weight 74 will instantly bolt the door in its closed position, and after collision release this bolt lock.

Most of the collisions are at a slight angle, as an example, when a left fore part of a vehicle collides with an oncoming vehicle at its left fore part; to meet these conditions applicant places an automatic door bolter at an angle as shown in Figs. 7 and 8, where a release slowing dash pot is also illustrated.

Here, the bolt 68' is held out of action by spring 69', seated on bell shaped spring retainer disc 70', having a sealing ring 76, arranged to operate in a cylinder 77 a part of a base plate 75'. The cylinder is provided with a large air outlet valve 78 yieldingly held on its seat by spring 79.

The bolt head 71' is operatively connected to stationary bracket 72', by lever 80, having a downward extension 81, and inertia mass 74'.

Upon head-on or angular collision substantially up to broadside the inertia weight 74' instantly bolts the door to the body. The spring and associated parts disposed in an air cylinder dash pot, having a large air outlet and a small air inlet (between the bolt sliding portion in the housing) will hold the door bolted to a predeterminable time, for a few minutes, when so desired, to permit the automobile to roll over a few times with closed doors, the lock automatically self-releasing thereafter.

The invention described in connection with Figs. 1 to 8 inclusive, for simplicity of presentation, is illustrated as being mounted in the interior of a front-hinged automobile door. An identical automatic device and with identical door bolting effect might be mounted in the body door pillar or in the body to the rear of a front-hinged rear door, or in the front end of a rear-hinged automobile door.

When it is desired to mount an automatic door bolter in the stationary part of the automobile (or in the front part of a rear-hinged door), applicant prefers to provide a dash pot release delaying device shown in Figs. 7 and 8, modified however, to operate on a link and not a lever, and having the inertia weight and bolt in one piece. For simplicity of presentation this device without a dash pot is shown in Fig. 9.

Here, an inertia mass 74" is integral with a door locking bolt 68", and is held out of action by a spring 69", seated on spring retaining flange disc 70". The inertia mass is provided with a head 71", operatively connected to stationary bracket 72", by link 82, having a spring action limiting nose 83.

Upon collision, the bolt holds the rear end of a front-hinged door to the body or when mounted into the front end of a rear-hinged door, it bolts the door front end to the door pillar.

Fig. 10 illustrates the essentials that will make certain types of automobiles safe from door opening in most collisions. These elements were described in connection with Figs. 1 to 5 inclusive and here only the handle and associated portions are modified, to correspond to a large quantity product. Here, door handle 47' can be lifted only, and acts against mild spring 50' and when returned, stops at stationary pin 52'. The door handle is integral with a depending lever 45' having in counter-acting association an upstanding lever 61' and inertia weight 62'. Without lever 61' and weight 62', the inertia of lever 45' and therewith directly associated parts, when in collision, could operate lever 41 tending to release the ratchet nose 31.

Applicant here presents various applications of the same invention, to be used in vastly different body and door construction, as an example, in some bodies the door pillar in between the front and rear door is too narrow for any device, in other designs there is ample room for a door locker. However, all of these proposals are operated by an inertia weight and all can operate automatically.

While I have herein shown and described only certain specific embodiments of my invention and have suggested only certain possible modifications, it will be appreciated that many changes and variations may be made to suit particular conditions and embodiments of use, without departing from the spirit and scope of my invention.

What applicant claims as his invention:

In an automobile body having a door opening and a cooperating door hinged adjacent thereto, and a lock structure including a toothed rack on said body and an operatively disposed toothed pinion on said door, a ratchet-wheel rigidly connected to said pinion for simultaneous movement thereof, a spring-biased ratchet-wheel-engaging pawl operatively disposed on a stationary pivot on said door, a door-opening handle on said door, a pawl-releasing lever on a stationary fulcrum on said door and having a slotted operative connection with said door-opening handle, and means connecting said pawl-releasing lever to said pawl for simultaneous movement of said lever and pawl; the improvement which comprises an arm on said lever extending substantially perpendicularly to the direction of forward movement of said automobile body and also in a direction, with respect to said body, which is opposite to the direction of movement of said means during unlatching movement of said pawl from holding engagement with said ratchet-wheel, and a mass on said arm having a moment of inertia about said stationary fulcrum which is greater than the combined moments of inertia of all of said lock structure elements which would tend to release said pawl during deceleration of said automobile body during forward movement whereby said mass tends to hold said pawl more firmly engaged with said ratchet-wheel during said forward movement deceleration of said automobile body.

References Cited in the file of this patent

UNITED STATES PATENTS

| | | |
|---|---|---|
| 1,627,728 | Conklin | May 10, 1927 |
| 2,173,765 | Potter | Sept. 19, 1939 |
| 2,189,748 | Wilson | Feb. 6, 1940 |
| 2,221,529 | Schoenhiet | Nov. 12, 1940 |
| 2,329,120 | King | Sept. 7, 1943 |
| 2,738,212 | Wise | Mar. 13, 1956 |

FOREIGN PATENTS

| | | |
|---|---|---|
| 223,464 | Great Britain | Oct. 23, 1924 |